US007099037B2

(12) United States Patent
Clark et al.

(10) Patent No.: US 7,099,037 B2
(45) Date of Patent: Aug. 29, 2006

(54) N-UP PRINTING

(75) Inventors: G. Phil Clark, Lutz, FL (US); Jeffrey W. Crawford, Penfield, NY (US); Kenneth M. McDonald, Murfreesboro, TN (US)

(73) Assignee: Lightning Source Inc., La Vergne, TN (US)

( * ) Notice: Subject to any disclaimer, the term of this patent is extended or adjusted under 35 U.S.C. 154(b) by 118 days.

(21) Appl. No.: 10/818,881

(22) Filed: Apr. 5, 2004

(65) Prior Publication Data

US 2004/0211330 A1    Oct. 28, 2004

Related U.S. Application Data

(60) Provisional application No. 60/464,677, filed on Apr. 22, 2003.

(51) Int. Cl.
*G06F 15/00* (2006.01)

(52) U.S. Cl. .................. 358/1.18; 358/1.13; 707/1; 707/517; 399/385; 715/530; 715/764

(58) Field of Classification Search ............... 358/1.13; 707/1, 517; 399/385; 715/530, 764
See application file for complete search history.

(56) References Cited

U.S. PATENT DOCUMENTS 5,331,387 A * 7/1994 Okada et al. ............... 399/385
5,953,007 A * 9/1999 Center et al. ............... 715/764
2002/0078012 A1 * 6/2002 Ryan et al. ................. 707/1
2004/0194033 A1 * 9/2004 Holzwarth et al. ......... 715/530

OTHER PUBLICATIONS

"IBM Page Printer Formatting Aid: User's Guide," *IBM Corporation*, Document No. S544-5284-08, Front Cover, Inside Front Cover, Table of Contents, Table of Figures, Table of Tables, Chapter 7, pp. 141-160 (Dec. 2003).

"Reference Guide, Phaser® 7750 Color Laser Printer," *Xerox Corporation*, Front Cover, Inside Front Cover, Table of Contents, pp. 2-74-2-84 (2004).

* cited by examiner

*Primary Examiner*—Kimberly Williams
*Assistant Examiner*—Satwant Singh
(74) *Attorney, Agent, or Firm*—Merchant & Gould P.C.

(57) ABSTRACT

A method and a computer data signal including instructions for processing printed unit orders for printing on printers adapted for printing N pages across a print web. The orders are grouped based on page type (e.g., size, thickness, color) and binding type into print batches. These print batches are sorted, processed and then sent to the printer. Printed units may be organized with N single printed units printed in parallel across the web, a single printed unit sorted into N sections printed in parallel across all of the webs, or in super batches including multiple printed units, with N super batches printed in parallel across the web.

35 Claims, 12 Drawing Sheets

FIG. 4
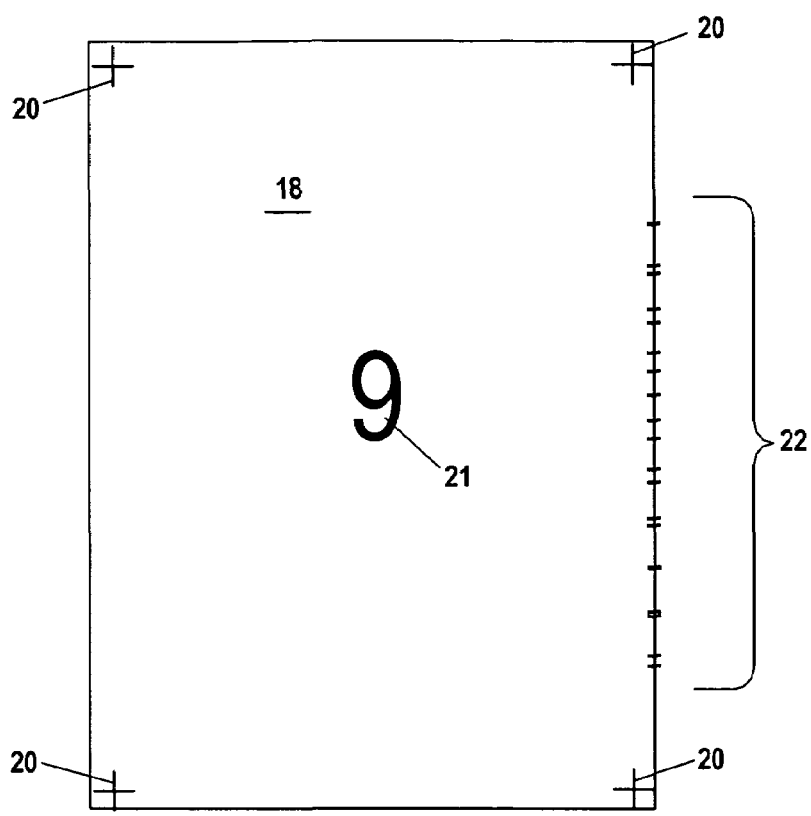
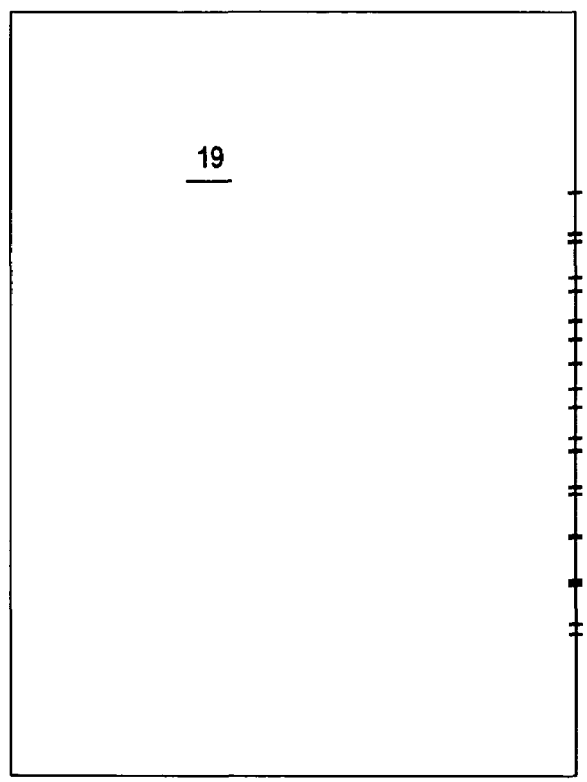

N-UP PRINTING

This application claims priority from provisional application Ser. No. 60/464,677, filed Apr. 22, 2003, and which is incorporated herein by reference.

TECHNICAL FIELD

The present invention relates generally to printing. More specifically, the present invention relates to N-up printing.

BACKGROUND

In digital printing, a known tradeoff exists between printing efficiency and printing flexibility. Digital printing (as opposed to offset printing) may involve the use of printers having printable page or web widths large enough to accommodate multiple publication pages side-by-side, referred to as N-up printing. N is the number of columns printed across the width of a web or other print medium. For example, if the web width can accommodate two publication pages side-by-side, this is referred to as 2-up; three pages side-by-side is referred to as 3-up, etc. The pages from the printer are then directed into a finishing device which separates (slits) publication page "columns" and then cuts the publication pages from each other, and then sorts and stacks the pages.

If the publication pages across the web are from a single copy of a single publication, the finishing device performs an operation referred to as slit-merge and all of the publication pages from the N-up web are sorted and ordered into a single stack for binding. Slit-merge refers to a method of finishing that accepts N-up web print output, cuts (slits) the web into pages, merges these pages into a single stack, and outputs this single stack with physical offsetting representing a logical break in output (e.g., a book, set of books).

If the publication pages across the web are from different publications or parallel copies of the same publication, the finishing device performs an operation referred to as slit-stack and the publication pages from the N-up web are sorted into N stacks. Slit-stack refers to a method of finishing which accepts N-up web print output, cuts (slits) the web into pages, and outputs N stacks of output, each stack representing a logical break in output (e.g., a book, set of books, or portion of a book).

For on-demand printing of single copies of individual publications (quantity 1, Print on Demand or POD), it would be desirable that slit-merge finishing be used so that these single copies could be sequentially printed, slit, sorted and segregated by the finishing device. However, current slit-merge finishing devices and methods are limited to 2-up printing. For 3-up printing, only slit-stack finishing technology is available. Consequently, there is no efficient method of performing on-demand printing of single copies of individual publications in an N-up mode where N is greater than 2. In addition, slit-stack technology is much less complex and paper-handling intensive than slit-merge technology. Therefore, as printer manufacturers support wider print webs, finishing equipment manufacturers develop slit-stack finishing technology for higher "N-up" values long before they develop slit-merge finishing technology for the same "N-up" value.

To provide efficient and cost effective high volume POD manufacturing, several technological advancements have been developed by digital printer hardware and finishing hardware manufacturers, including high volume POD production control and printer management and wide (e.g., 19"+) paper web support. However, printers have not been able to realize the full potential of these advances because they have been limited to 2-up slit-merge printing, 2-up slit-stack printing, and 3-up slit stack printing.

SUMMARY

In general terms, the present invention relates to preparation and printing of printed units on a printer capable of printing multiple pages across a web.

One aspect relates to a method of preparing a plurality of printed units for printing on a printer adapted for printing N pages across a web, including grouping the printed units based on page type and binding type and sorting the printed units within a group of similar page type and binding type by page count. N printed units are combined which have similar page counts. Pad pages are added to any of the N printed units as necessary so that each printed unit may be formed into a print column, with each print column having the same number of pages. Each of these print columns is processed into a print batch.

Another aspect relates to a method of preparing a plurality of printed units for printing on a printer adapted for printing N pages across a web, including grouping the printed units based on page type and binding type. The printed units are combined into N batches with each batch including one or more printed units to minimize the difference in the total number of pages of the printed units in each of the N batches. Pad pages are added to equalize the number of pages within each of the N batches. Each of the N batches is processed into a super batch to print on the printer so that a first batch prints on a first print column on the web, each successive batch prints on a successive print column on the web, and the N batch prints on an Nth print column of the web.

A further aspect relates to a method of preparing a plurality of printed units for printing on a printer adapted for printing N pages across a web. Each printed unit is divided into N sections and pages are added to any of the N sections for each printed unit to equalize the number of pages within each section of the printed unit. Each of the N sections of each printed unit are processed into a printing batch with N print columns, with the first section of the first printed unit at a top of the first print column, followed by the first section of each of the successive printed units in the first print column, each successive section of the first printed unit at a top of each of the successive print columns followed by the successive sections of the successive printed units in those print columns.

A further aspect relates to a computer data signal readable by a computing system and encoding instructions for executing a computer process for preparing a plurality of printed units for printing on a printer adapted for printing N pages across a web. The computer process includes grouping the printed units based on page type and binding type and sorting the printed units within a group of similar page type and binding type by page count. N printed units with similar page counts are combined, each N printed unit into a one of N print columns and pad pages are added to any of the N printed units as necessary to form N print columns each having the same number of pages. The N print columns are processed into a batch for printing.

A further aspect relates to a computer data signal readable by a computing system and encoding instructions for executing a computer process for preparing a plurality of printed units for printing on a printer adapted for printing N pages across a web. The computer process includes grouping the printed units based on page type and binding type. Similar printed units are combined into N batches with each batch including one or more printed units to minimize the difference in the total number of pages of the printed units in each of the N batches. Pad pages are added to equalize the number of pages within each of the N batches. Each of the N batches is processed into a super batch to print on the printer so that a first batch prints in a first print column on the web, each successive batch prints on a successive print column on the web, and the N batch prints on an Nth print column of the web.

A further aspect relates to a computer data signal readable by a computing system and encoding instructions for executing a computer process for preparing a plurality of printed units for printing on a printer adapted for printing N pages across a web. The computer process includes providing a plurality of printed units, and dividing a first printed unit into N sections and adding pages to any of the N sections for first printed unit to equalize the number of pages within each section. Each successive printed unit is also divided into N sections. Pages are added to any section of each printed unit to make the number of pages in each of the sections within a printed unit are equal. Each of the N sections of each printed unit are processed into a printing batch with N print columns. The first section of the first printed unit at a top of the first print column, followed by the first section of each of the successive printed units in the first print column, each successive section of the first printed unit at a top of each of the successive print columns followed by the successive sections of the successive printed units in those print columns.

BRIEF DESCRIPTION OF THE DRAWINGS

The accompanying drawings, which are incorporated in and constitute a part of the description, illustrate several aspects of the invention and together with the description, serve to explain the principles of the invention. A brief description of the drawings is as follows:

FIG. 4 is a diagram illustrating two forms (one form annotated and one form blank) of a pad page according to the present invention.

DETAILED DESCRIPTION

Figure 1:
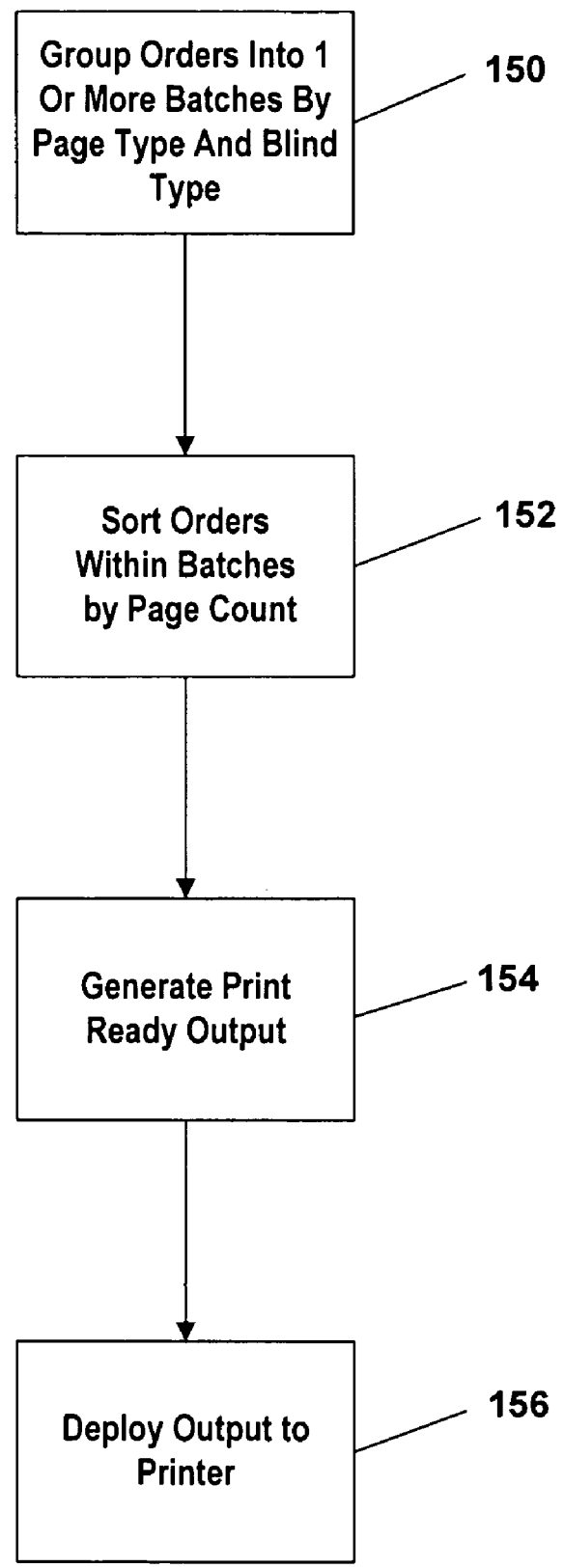
FIG. 1 is a flow chart showing a process for preparing printed unit orders for printing according to the present invention.

Reference will now be made in detail to exemplary aspects of the present invention which are illustrated in the accompanying drawings. Wherever possible, the same reference numbers will be used throughout the drawings to refer to the same or like parts. The logical operations of the various embodiments of the invention herein may be implemented as a sequence of computer implemented operations running on a computing system and/or interconnected machine modules within a computing system.

Additionally, the logical operations of the various embodiments of the invention described herein are implemented as: (1) a sequence of computer implemented operations running on a computing system; and/or (2) interconnected machine modules and sub-systems within the printing system. Machine modules and sub-systems represent functions executed by program code such as code found in a dynamic-link library (DLL), interpreted script code, or compiled/executable computer programs. The implementation used is a matter of choice dependent on the performance requirements of the hardware embodying the claimed invention. Accordingly, the logical operation making up the embodiments of the invention described herein are referred to as operations, sub-systems, and systems.

Print on Demand (POD) may be printing content in small quantities, typically by digital printing, but may also be applied to the printing of any size quantities. The POD model provides the flexibility to print in unit quantities as small as one without incurring the setup costs associated with traditional printing methods (e.g., offset printing).

A printed unit is typically a logical unit of printed content with or without a cover. The exemplary embodiment disclosed herein describes printing a printed unit. However, a printed unit can include any printed material such as books, book sections, pamphlets, brochures, photographs and cards. The present invention is not restricted to a particular data format or degree of processing of the digital data from which the pages of the printed unit may be printed. Printed unit data is the digital data corresponding to the printed content that is processed prior to printing in a hardcopy format. This digital data may be in a variety of formats that permit processing and printing.

Reference herein is made to "printed unit" to generally denote digital data and orders corresponding to printed material, and to "book" to generally denote the output of the processes used to fulfill a copy or unit of a customer order. Additionally, reference herein is made to "page" to generally denote a virtual or physical sheet of paper embodying two sides, each of which may have a page image printed on it (i.e., a page is a two sided, or duplex, concept, although a page may have an image or text printed on only one side). Reference herein is made to "page count" to generally denote a measure of the length of a print unit, not merely the number of physical pages. Accordingly, page count can connote physical page count, virtual page count and/or physical or virtual page lengths. These references are intended only for clarity of expression and are not intended to be limiting of the scope of the invention embodied in the claims.

Figure 10:
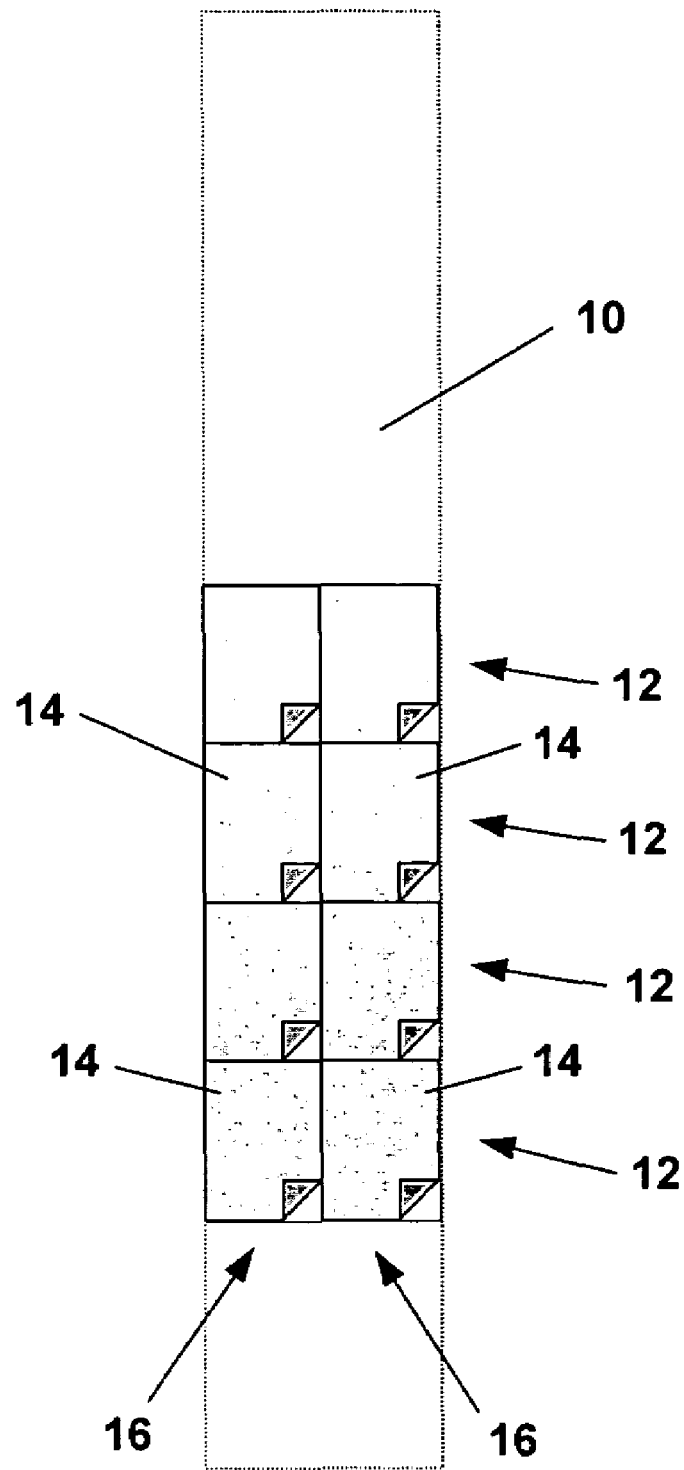
FIG. 10 is a diagram illustrating a prior art 2-up print web layout for printing on a digital printer.
Figure 11:
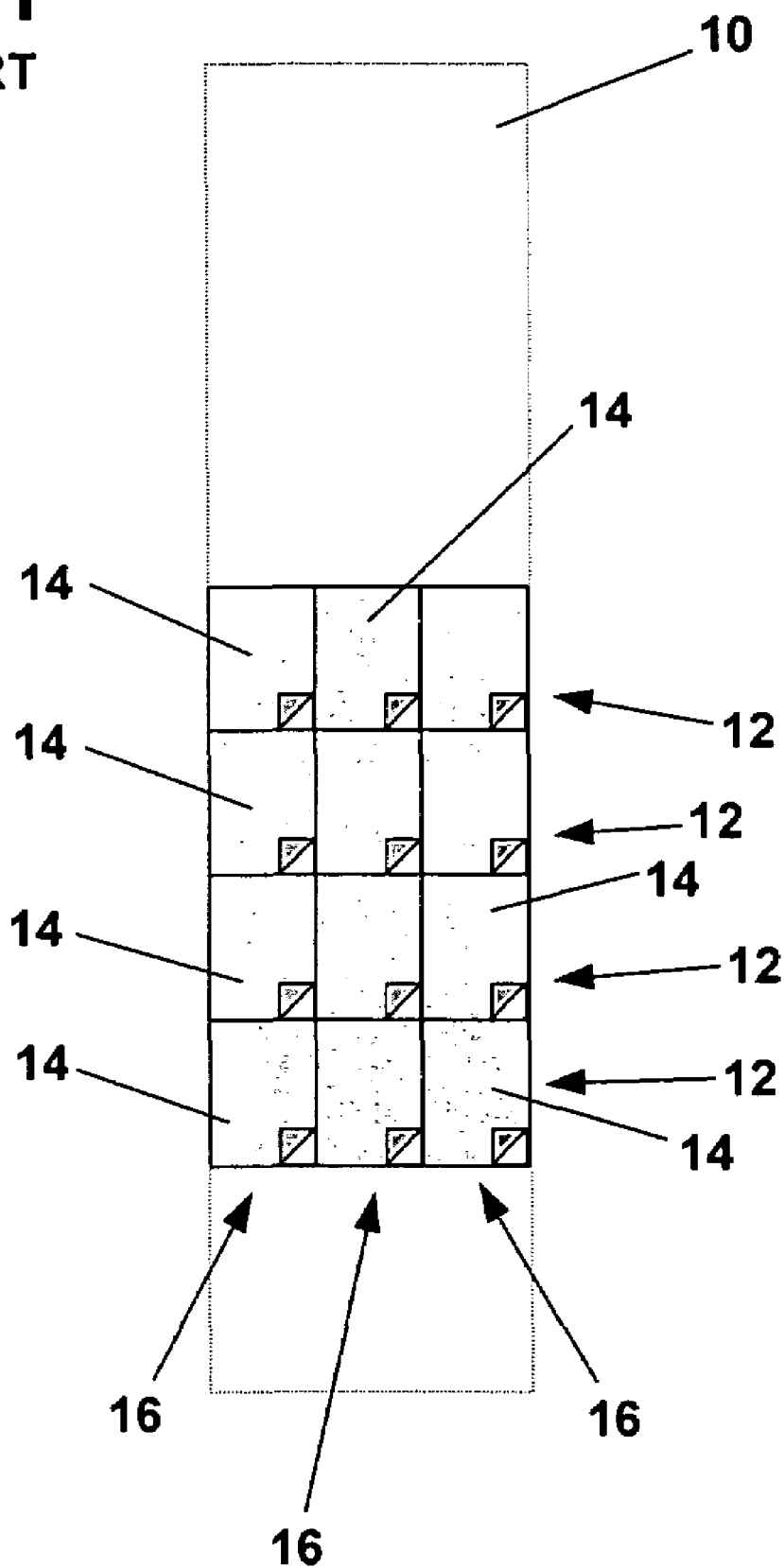
FIG. 11 is a diagram illustrating a prior art 3-up print web layout for printing on a digital printer.
Figure 12:
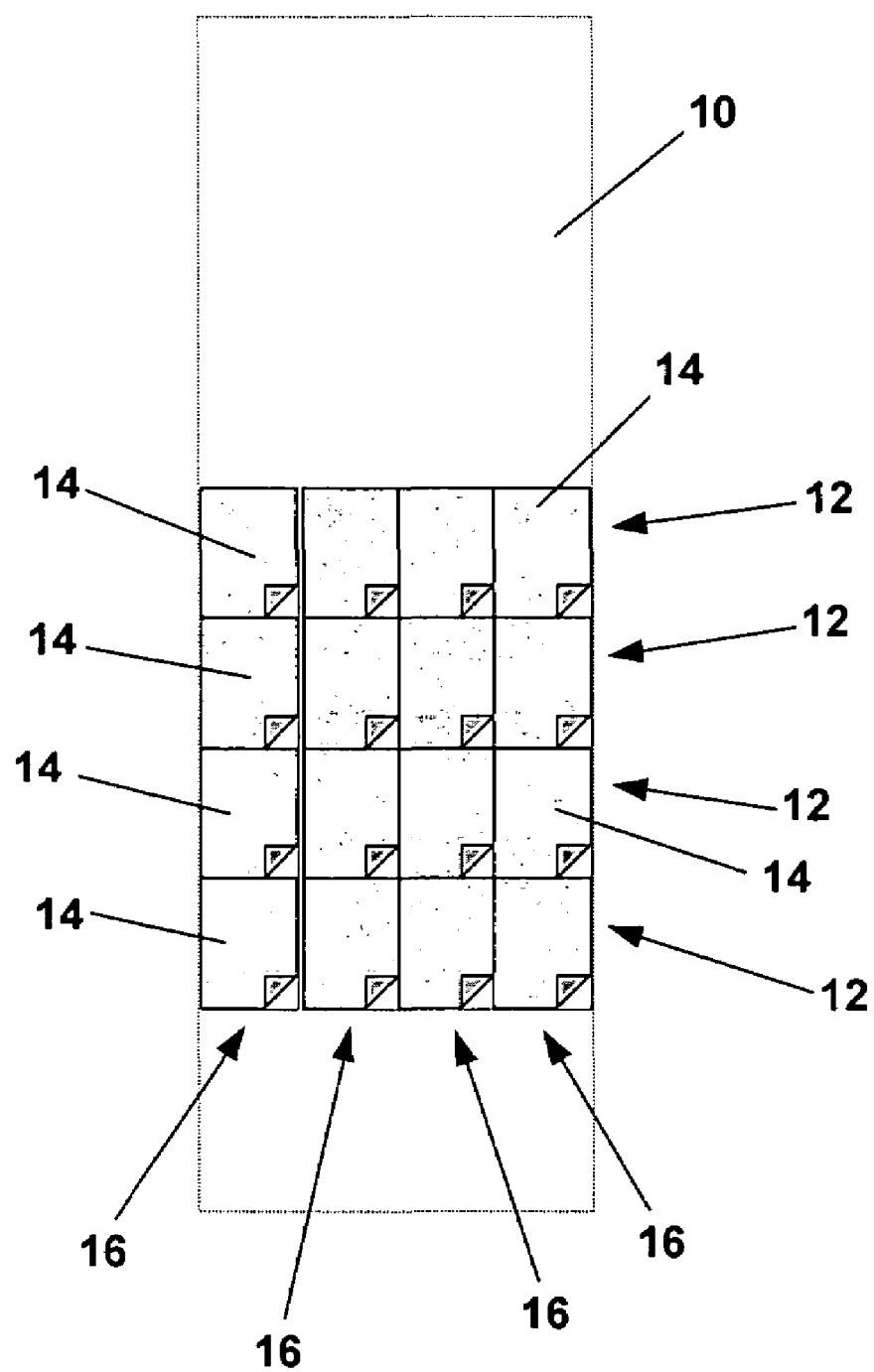
FIG. 12 is a diagram illustrating a prior art 4-up printing web layout for printing on a digital printer.

N-up printing is a printing layout where N individual output pages are formatted side-by-side across a print web. For example, 2-up, 3-up, and 4-up (N=2, 3, and 4 respectively) are illustrated prior art FIGS. 10, 11, and 12, respectively. In each of these FIGS., a print web 10 includes a plurality of rows 12 including N print columns 16 of pages 14.

Presented below are three possible models illustrating embodiments of using advanced job stream processing algorithms (software) which allows an N-up slit-stack printer to be used for POD order quantities of 1, where N>2. These three models are exemplary only and should not be understood as limiting the scope of the methods, signals and apparatus claimed.

These models can be implemented as either pre-RIP processing workflow operations, or post-RIP processing workflow operations, or may be directly integrated into print drivers for processing on the fly. RIP, RIPed, RIPing refers to "Raster Image Process", "Raster Image Processed", and "Raster Image Processing" respectively. Raster Image Processing is the process of processing a computer output file into a printable format supported by a digital printer. Some print drivers are capable of handling this sort of processing without the need for a separate RIP operation.

In all models, the following is an example of one possible exemplary approach of a pre-RIP processing workflow, although other approaches are anticipated. The approach is shown in the flow chart of FIG. 1.

Groups of unit orders (i.e., quantity 1 and higher) are grouped into manufacturing batches by page type (e.g., size, thickness, color) and bind type in operation 150. While the batch size is completely flexible, algorithms are used to ensure page counts have significant similarity as to minimize waste that may be introduced by the models described below. The manufacturing batches (or batch sets) are sorted by page count in operation 152. The manufacturing batches (or batch sets) are then RIPed into print-ready output (e.g., RIPed AFP, Postscript, PDF, TIFF, bitmap) in operation 154. One possible embodiment utilizes AFP, or "Advanced Format Presentation," includes a data format developed by IBM for digital output. AFPDS includes a RIPed version of AFP, ready to be printed by digital printers supporting the AFP format. Although certain data formats are disclosed herein, the processes, signals, and apparatuses can utilize any printer language and data format.

Following these operations, the manufacturing batches (or batch sets) are printed using high-volume N-up printing. Any possible model, including those described below, may be used to implement the high-volume, N-up printing. If these models are implemented post-RIP, then operation 154 may be eliminated and operation 156 is executed following operation 152. These models may be implemented for a variety of different printed matter, including, but not limited to, the printing of black & white printed units without covers where color covers are produced via a separate print or "pull" process, entire black & white printed units, where there is no separate cover production, or entire color printed units including covers.

Figure 2:
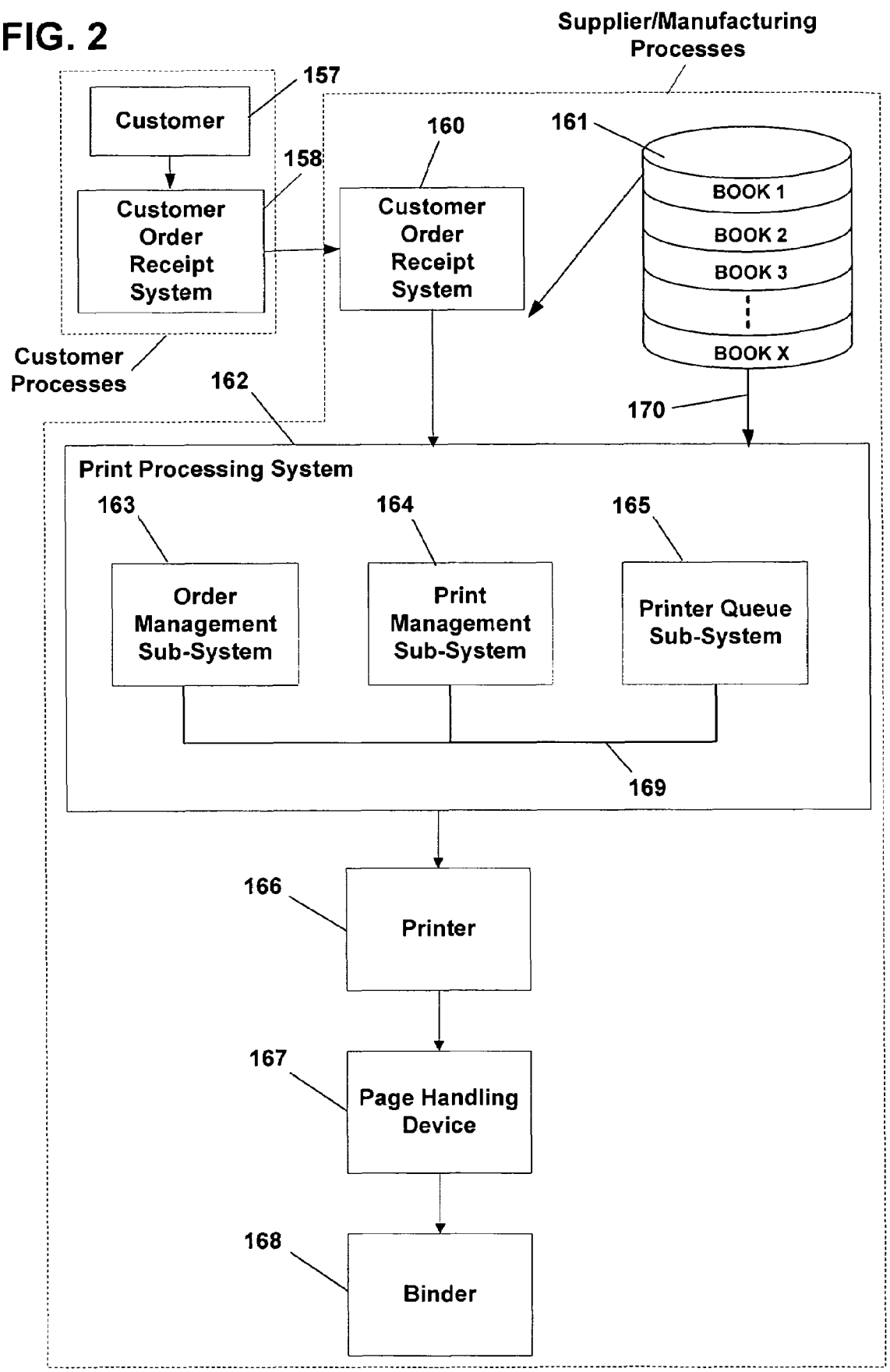
FIG. 2 is a block diagram of systems and devices for preparing and printing printed unit orders in accordance with the present invention.

One possible environment in which operations 150, 152, 154 and 156 are performed is shown in FIG. 2. In this exemplary environment, orders are first received from a customer 157 and processed by a customer's order placement system 158. These orders may be for a single copy of a single printed unit, multiple copies of a single printed unit, or one or more copies of one or more different printed units. Customer 157 can be any entity that places an order for printed materials, such as a retail customer or a commercial clearinghouse. Customer order receipt system 160 may also receive current profile information (e.g., bind type, page count, etc) from a digital storage system 161, which stores digital copies of multiple printable units (e.g., book 1, book 2, book 3, etc.) available for order and printing. In one possible embodiment, when customer order receipt system 160 receives an order for a printable unit, it retrieves the ordered printable unit from digital storage system 161 to begin the printing process. Alternative embodiments can include multiple customer order receipt systems 160 and digital storage systems 161. For example, there might be one customer order receipt system 160 for retail customers, one for wholesalers, one for clearinghouses and one for educational customers. In another example, there might be different digital storage systems 161 to store large volumes of printed units, or for different categories of printed units.

A print processing system 162 is also linked by a data link 170 with digital storage system 161 for access to the available digital copies of printed units held by digital storage system 161. Data link 170 may be a direct electrical connection via a local bus, a local area network or a wide area network. Alternatively, data link 170 may incorporate wireless communication technology or may be a hybrid electrical and wireless link. Print processing system 162 may include an order management subsystem 163, a print management subsystem 164, and a printer queue subsystem 165. Though these subsystems 163, 164 and 165 are shown as discrete systems, it is intended that they include any set of hardware and/or code for performing the functions described herein. Alternatively, each of the subsystems 163, 164 and 165 may be separate independent systems linked by a communications network 169.

Order management subsystem 163 receives orders from customer order receipt system 160. In one possible embodiment, order management sub-system 163 retrieves the digital copies of the printed units in each order directly from digital storage system 161. Alternatively, order management system 163 receives both the customer order and the digital copy of the printed units in the order from customer order receipt system 160. Order management sub-system 163 organizes and sorts the orders as will be described in further detail below.

Once the orders have been sorted, they may be passed to print management subsystem 164 for processing into print ready files, as will described further below. These print ready files then may be handed off to printer queue subsystem 165 which holds the files and sends them to a printer 166 based on but not limited to manufacturing operations process efficiency (e.g., binding operations), customer priority, order priority, available resources and other criteria.

Printer 166 is a digital printer capable of printing up to N pages across a wide print web or sheet. Printer 166 may output a printed web or sheets to a page handling device 167. Page handling device 167 organizes the printed web or sheets to correspond to the print units requested in the customer orders received. A variety of approaches to handling and organizing printed pages have been discussed above and described in further detail below. Such approaches may include but are not limited to slit-stack and slit-merge, for N pages across each web received from printer 166. Regardless of the approach used by page handling device 167, from device 167 groups of printed pages are forwarded to a binder 168 for final binding and trimming into a book corresponding to the orders received from the customer.

Each of the systems 160, 161, 162, 163, 164, and 165, and devices 166, 167 and 168 described within FIG. 2 may be sub-systems of a single system that combines and performs all of the functions. Alternatively, each of the systems 160, 161, 162, 163, 164, and 165, and devices 166, 167 and 168 may be separate, independent systems connected by a communications network, such as network 169. Systems 160, 161, 162, 163, 164, and 165, and devices 166, 167 and 168 may be commonly located or geographically separated. As a further alternative, a customer order for a printed unit within digital storage system 161 may be delivered to the customer or another party as a book in digital form for printing by the customer or another party or for use in a digital format by the customer or another party.

Figure 3:
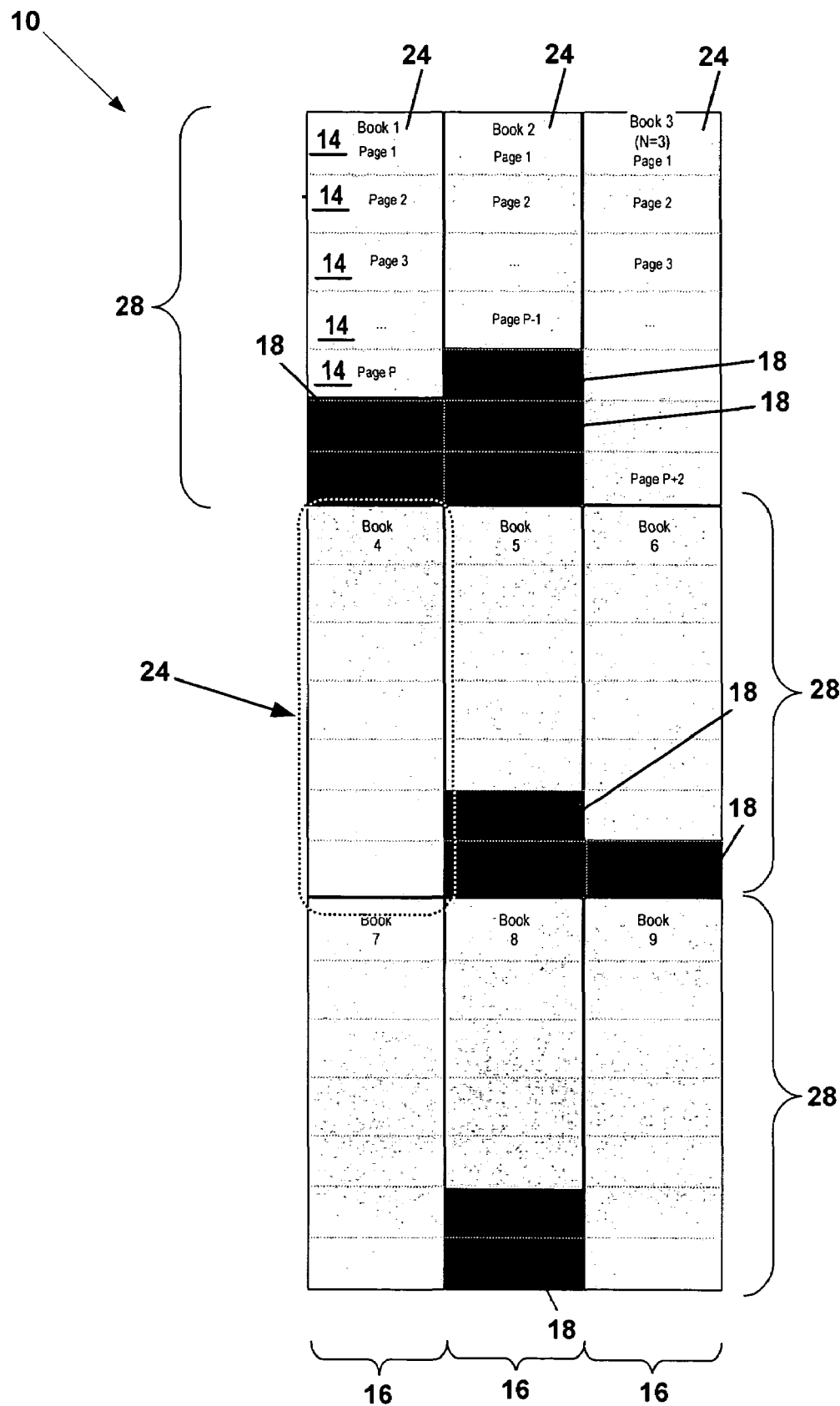
FIG. 3 is a diagram of a first embodiment of a print web layout for printing multiple publications in a 3-up arrangement according to the present invention.

FIG. 3 depicts the result of a single batch, book padding process in a 3-up implementation. Book padding refers to the addition of blank pages, or pad pages, into a printed unit for printing so that all of the printed units within a print group have the same number of pages, as is described further, below. Accordingly, pad pages can be removed from the printed unit prior to binding.

The software algorithms may drive any N-up implementation (2, 3, 4, etc), although a 3-up implementation is shown in the exemplary embodiment illustrated in FIG. 3. Each group 28 includes three print units 24. One or more pad pages 18 are added as necessary to pages 14 of print units 24 to ensure that all print units 24 within a group 28 have the same number of pages. Each print unit 24 within a group is arranged within one of the three print columns 16. Multiple groups 28 may be arranged sequentially with print units 24 in each group 28 aligned within one of the N print columns 16. With the addition of pad pages 18, each print column 16 has the same number of pages. Additionally, the first page of all of the print units 24 within a particular group 28 is located in the same relative location in its print column 16.

Referring now also to FIG. 4, pad page 18 is shown in further detail. A pad page 18 is an extra page inserted into a job stream (or print column) to lengthen a unit or batch.

Pad pages 18 are removed either manually or by post printing or finishing processes or devices, such as page handling device 167, and typically discarded as scrap. Pad pages 18 may have any combination of marks printed on them. Examples of such marks include:

One or more orientation marks 20 to assist printer operators in the validation or verification of printer alignment. As shown, orientation marks 20 are positioned adjacent the corners of pad page 18. Alternative locations and configurations are also anticipated within the present invention.

A prominently displayed descending pad page count 21 indicating how many pad pages are present below the current pad page 18 (if X pad pages 18 exist, the last pad page 18 will be numbered X, the pad page 18 under page X will be numbered X−1, etc); this count assists manual operators in removing pad pages 18 (if the pad page removal operation is manually implemented).

An automation mark 22 to be used by automated page removal processing equipment (e.g., barcode, mark-sense mark, etc). Automation mark 22 is typically positioned adjacent a side of pad page 18, although automation mark 22 may be in other locations on pad page 18.

Alternatively, blank pad pages 19 may be used. Pad pages 19 need not be removed. Instead, they may become part of the finished book. Pad pages 19 are used when the number of pad pages required is small enough so as not to detrimentally impact the finished book. For example, adding too many blank pad pages 19 could result in a spine sufficiently thicker than its intended size that the graphical design of the book cover is unacceptably distorted. With such an example, pad pages 18 would be more appropriate as these would be removed prior to book binding operations.

The following examples illustrate how the appropriate number of pad pages are determined when a print unit 24 is included entirely within a single print column 16. As shown in FIG. 3, the leftmost print unit 24 of the topmost group 28 has P pages, the middle print unit 24 has P−1 pages and the rightmost printed unit has P+2 pages. To equalize the number of pages of each printed unit within the group, two pad pages 18 are included at the end of the leftmost print unit 24 and three pad pages 18 are added to the middle printed unit 24.

In another example, N=2 and thus there are two print units 24 in a group 28, one print unit 24 in each print column 16. If the first print unit 24 has 256 pages and the second print unit 24 has 254 pages, then the second print unit 24 would have 2 pad pages added. In yet another example, N=3 and there are three print units 24 in group 28. If the first print unit 24 has 254 pages, the second print unit 24 has 253 pages and the third print unit 24 has 256 pages, then the first print unit 24 would have 2 pad pages added and the second print unit 24 would have 3 pad pages added. And in a further example, N=4 and there are four printed units 24, one in each print column 16 of group 28. If the first print unit 24 has 256 pages, the second print unit 24 has 254 pages, the third print unit 24 has 252 pages, and the fourth print unit 24 has 251 pages then the second print unit 24 would have 2 pad pages added, the third print unit 24 would have 4 pad pages added, and the fourth print unit 24 would have 5 pad pages added. Yet other exemplary embodiment might include more than 4 print columns 16.

In one possible embodiment, algorithms may group small quantities of the same printed unit (e.g., orders for the same printed unit in a quantity greater than 1) together to minimize pad pages. For example, in a N=3 embodiment, a print unit 24 with an order quantity of 3 would be positioned to occupy all three print columns 16 of a 3-up group 28 so as to eliminate the need for pad pages in that group 28. A print unit 24 with an order quantity of 5 would occupy all three print columns 16 of one 3-up group 28 and two print columns of a second 3-up group 28. A second print unit 24 would be added to the third print column 16 of the second group 28. Additionally, when different printed units 24 are included in a single group 28, then printed units 24 having the smallest difference between their total number of pages are selected for inclusion in a single group 28.

Groups 28 which have been printed might be output via N-up slit-stack finishing equipment. An offset command (instructing a paper handler to insert jogs or eject the physical output) maybe inserted between each group 28 of print units 24 to permit easier identification of the end of each group 28 and print unit 24 with pad pages 18 included. An offset command is a command to the printer which inserts a jog, offset or some other physical break in the stack of output print webs so that the end of print units 24 within the digital print file can be easily identified. This break will permit easy identification of the individual print units 24 within each print batch 26 when the webs are organized for binding processing or other downstream finishing operations.

As described above, pad pages 18 are removed after the printed units are printed while pad pages 19 are not removed. In at least one possible embodiment, pad pages 18 are removed, either manually or automatically by equipment such as mark-sensing page removal equipment before additional processing operations are performed on the print units 24.

Figure 5:
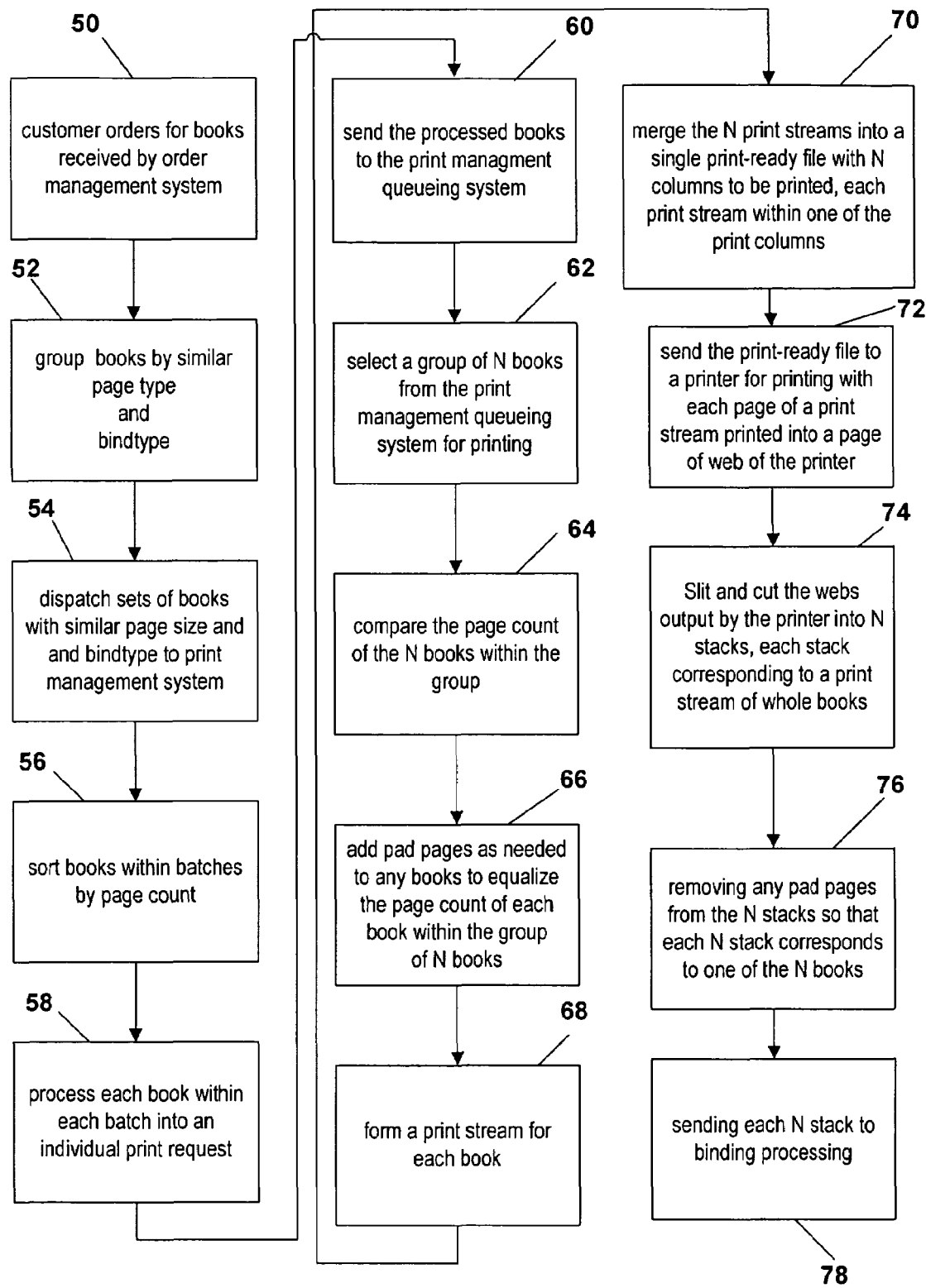
FIG. 5 is a flow chart of a first embodiment of the operations for preparing multiple publications for N-up printing in the print web layout shown in FIG. 3.

Referring now to FIG. 5, a flow chart shows a process of preparing print units 24 for printing in the format shown in FIG. 3. In operation 50, orders for printed units from customers are received by an order management system. These orders are then grouped by page type (e.g., size, thickness, color) and binding type in operation 52. Grouping on these criteria allows for printed units with similar type pages (e.g., size, thickness, color) and style or method of binding to be printed together to improve efficiency in processing the pages into printed units after printing. In one possible embodiment, orders received from different customers 158 are sorted together to further enhance efficiency.

In operation 54, sets of print units 24 having similar page types and binding types are formed and in operation 56, the print units 24 within these sets are sorted by page count. Sorting by page count permits printed units 24 with roughly the same number of pages to be printed together, thereby reducing the number of pad pages 18 or 19 required. With large enough batches, the number of pad pages required becomes small enough so that the pad pages can be included in the final bound book.

Once sorted by page type (e.g., size, thickness, color), bind type and page count, the printed units 24 ordered by customers are processed into print requests in operation 58 and sent to a print management queuing system in operation 60. The print management queuing system then selects a group of N printed units 24 with similar page counts from the set of printed units 24 having similar page type (e.g., size, thickness, color) and bind type.

The N printed units 24 within the group are prepared for printing in the layout shown in FIG. 3 by first comparing the page count of the N printed units 24 in operation 64. In operation 66, those printed units 24 having fewer pages than the largest print unit 24 of the group have pad pages 18 or 19 added to them until all printed units 24 within the group have a page count equal to the page count of the largest printed unit 24. Pad pages 19 may be used when the number of pad pages required is small enough so as not to detrimentally impact the finished book. For example, adding too many blank pad pages could result in a spine sufficiently thicker than its intended size and may result in the graphical design of the book cover being unacceptably distorted. With such an example, pad pages 18 would be more appropriate as these would be removed prior to book binding operations.

In operation 68, each of the N print units 24 is formed into a print stream or print column 16 for printing. A print column 16 includes all the pages 14 of the print unit 24 and any pad pages 18 added to printed unit 24. These N print columns 16 are merged into a print ready file in operation 70. Within the print ready file, the information in each print stream is positioned within one of the print columns 16 and the corresponding pages 14 of each print unit 24 are positioned adjacent each other for printing (e.g., first page 14 of print unit 24 in the first print column 16 is printed alongside first page 14 of print unit 24 in the second print column 16 which is printed alongside first page 14 of print unit 24 in third print column 16).

In operation 72, the print ready file with the N print columns 16 is sent to printer 166 for printing. After printing, pages 14 of each printed unit 24, including any pad pages 18 or 19, are slit from pages 14 of the adjacent printed units 24 in operation 74. Once slit, pages 14 and pad pages 18 or 19 of each print unit 24 are cut and arranged in a stack. Pad pages 18, if any, are removed from pages 14 of each print unit 24 in operation 76 so that only pages 14, or pages 14 plus any pad pages 19, to be bound into a hardcopy printed unit for delivery to the customer are forwarded to binder 168 in operation 78. Operations 74 and 76 may be performed by page handling device 167 or a combination of printer 166 and page handling device 167.

Figure 6:
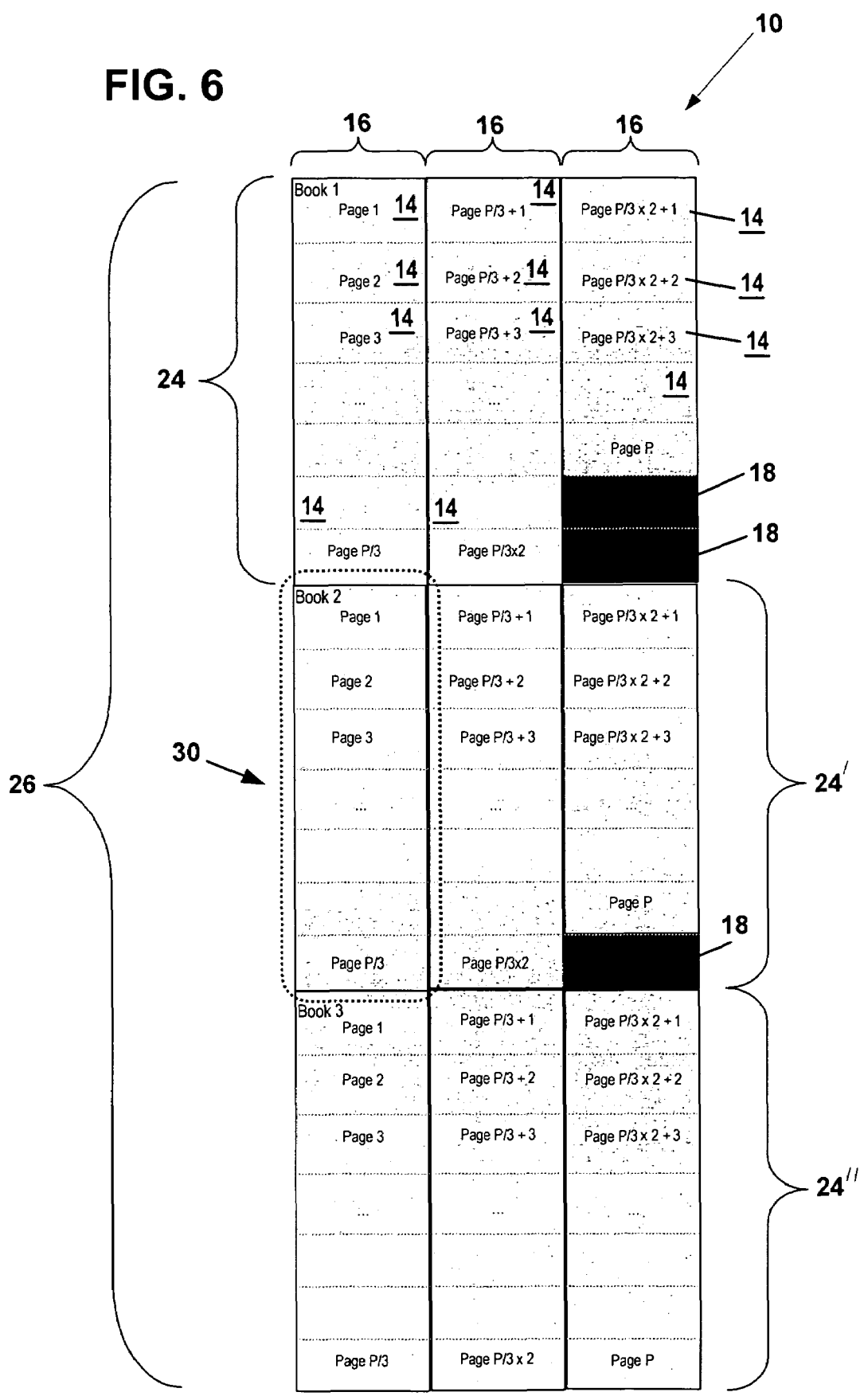
FIG. 6 is a diagram of a second embodiment of a print web layout for printing a single publication in a 3-up arrangement according to the present invention.

FIG. 6 illustrates a second possible embodiment in which a single batch, 1/N book splitting model is used for a multi unit batches (e.g., many printed units 24 in a single batch) and may be used with more than N=2 or 3. In this second embodiment, N can be any number as supported by current and future N-up printing technologies (e.g., N=4 or more). Although FIG. 6 depicts a 3-up implementation, any N-up implementation (2, 3, 4, etc.), may be used.

With this model, a print unit 24 is divided into N sections 30 (N representing N-up) so that there is one section 30 for each print column 16 of the web. Each web print column 16 may include more than one section 30 of multiple printed units 24 and these multiple printed units 24 may be combined into a print batch 26. N/P (rounded up to the next whole number) pages 14 of a print unit 24 represent a section 30 of that printed unit 24. As shown in FIG. 6, the sections 30 of each of the printed units 24, 24' and 24" (book section 1, book section 2, book section 3, respectively) in batch 26 are arranged side-by-side in print columns 16

If print unit 24 is not evenly divisible by N, then up to N−1 blank pad pages 19 are inserted after the last page of the print unit 24 to ensure all N sections of the split print unit 24 are of equal length. These blank pad pages 19 will become part of the finished book. In one possible alternative embodiment, N−1 pad pages 18 are inserted at the end of the print unit 24 to ensure all N sections of the split print unit 24 are of equal length. These pad pages 18 would then be manually or automatically removed prior to binding the printed unit. Another possible embodiment could include a combination of both types of pad pages 18 and 19.

The number of pages 14 that are inserted into each print column 16 are calculated by dividing the total number of pages 14 in the printed unit by N, which results in a quotient P/N. The quotient P/N is rounded upward to the next whole number to determine the total number of pages in each print column 16. The pages 14 for print unit 24 to be printed are arranged in the print columns 16 and either pad pages 18 or blank pad pages 19 are inserted into a print column 16 as necessary until the total number of pages in that print column 16 equals the rounded up value of the quotient equal to P/N, where P is the number of pages 14 in printed unit 24. In one possible embodiment, all but the last or Nth print column 16 is loaded with the number of pages 14 from print unit 24 that equals the rounded up value of the quotient equal to P/N. Pad pages 18 or blank pages are then added to the Nth or last print column 16 until the total number of pages (pages 14 and pad pages 18 or blank pages together) in the Nth print column 16 equals the rounded value of the quotient equal to P/N.

No more than two (N−1 where N=3) pad pages 18 or blank pad pages 19 are required within a particular printed unit to provide an even number of pages in each print column 16, for N=3, as illustrated in FIG. 6.

In the example illustrated in FIG. 6, the topmost print unit 24 has two pad pages 18, the middle printed unit 24' has one pad page 18 and the lowest printed unit 24" has no pad pages. Other embodiments and configurations are possible. For example, if two pad pages are required, they could be included in different print columns 16, and they could be located in different locations other than the bottom of a print column 16. Additionally, a layer of pad pages could be placed at the bottom of all print columns 16 in a given print unit 24 to separate one print unit 24 from adjacent printed units 24 that are either immediately below or above it. An offset command (jogs or ejects the physical output) may be inserted within the digital print file between each printed unit.

Completed printed units 24 can be assembled in a variety of ways. In the example illustrated in FIG. 6, the pages in a section 30 are stacked and then the sections are stacked in order from left to right. The assembly of sections 30 can be in any order as desired. Also, both manual assembly or automated assembly (e.g., conveyer assisted) could be used to stack sections 30 of printed units 24.

Pad pages 18 (if used) are removed, either manually or automatically by mark-sensing page removal equipment (as described above), before pages 14 are bound. In one possible embodiment, pad pages 18 are removed after pages 14 are stacked and before they are bound. As mentioned above, any blank pad pages 19 inserted to equalize the length of the N sections 30 for each print unit 24 could become bound within the book used to fulfill the customer order and thus need not be removed after printing.

Figure 7:
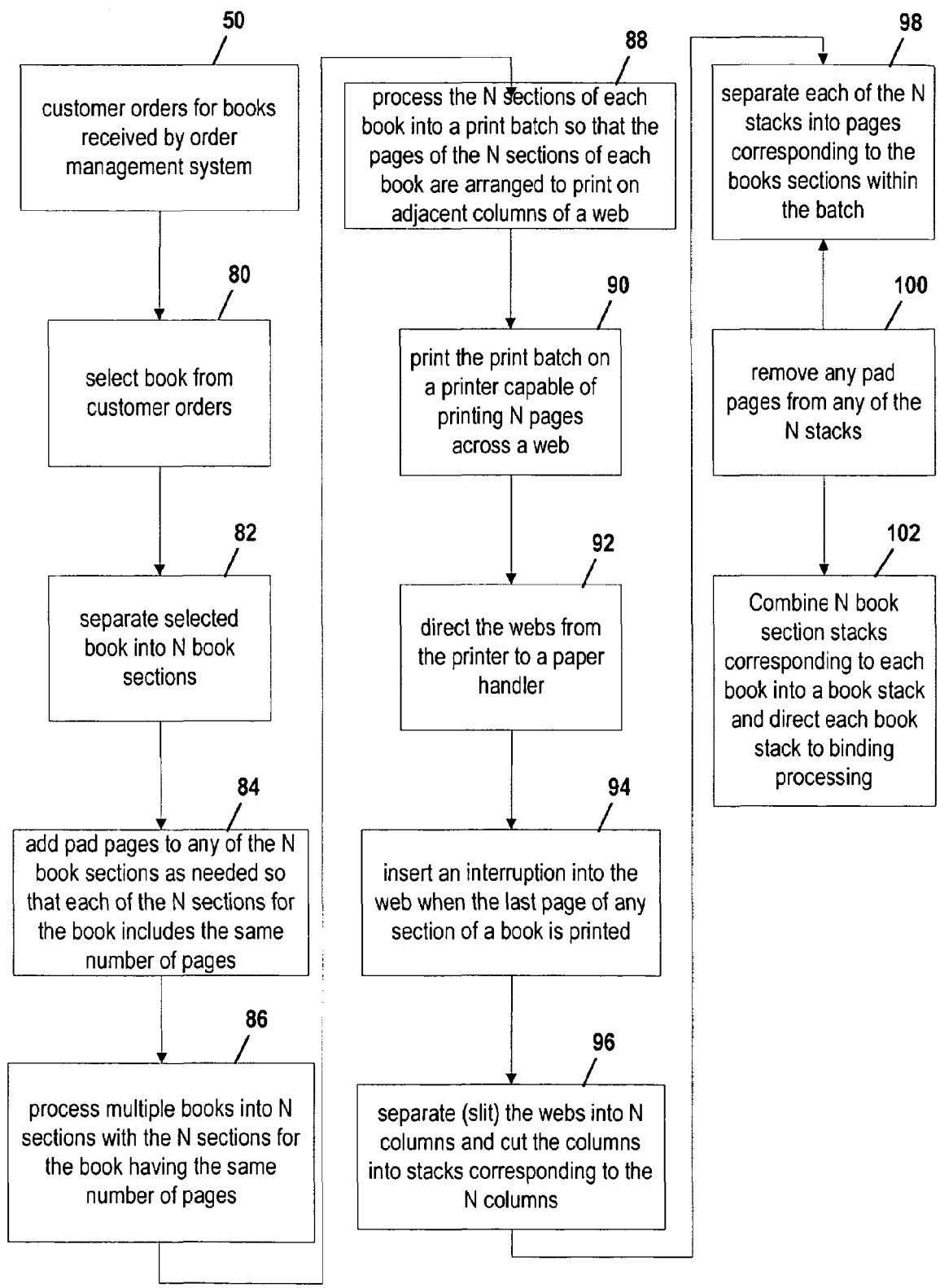
FIG. 7 is a flow chart of a second embodiment of the operations for preparing a single publication for N-up printing in the print web layout shown in FIG. 6.

Referring now to FIG. 7, a flow chart shows a process of preparing printed units 24 in a batch 26 for printing in the format shown in FIG. 6. A customer order being received in operation 50 by the order management system, and then a print unit 24 is selected for printing based on some pre-established criteria in operation 80. These pre-established criteria might include first in-first out, batched by customer for customers with multiple orders, batched by page type (e.g., size, thickness, color), batched by bind type, batched by varying priority of delivery, or other criteria. Combinations of such criteria might also be used to make the print unit 24 selection of operation 80. In one possible embodiment, orders received from different customers 158 are sorted together to further enhance efficiency.

In operation 82, the selected print unit 24 is divided into N sections 30, where N is the number of print columns 16 across a print web 10. As shown in FIG. 6, N=3. After print unit 24 is divided into sections 30, sections 30 are compared for page count and pad pages 18 or 19 are added as necessary in operation 84 so that each section 30 for a particular print unit 24 has the same number of pages. Subsequent printed units 24 are selected from the order management system and are similarly processed in operation 86 so that each of the printed units 24 is divided into N sections 30 and each section 30 of a print unit 24 has the same number of pages as other sections 30 of the same printed unit. It is not necessary for sections 30 of different printed units 24 to have the same number of pages.

Alternatively, in operations 84 and 86, blank pad pages 19 may be inserted into any of the sections 30 to ensure that each section 30 within a particular print unit 24 has the same number of pages. If blank pad pages 19 are used as opposed to pad pages 18, these blank pages need not be removed prior to binding and may be bound into the finished book.

Sections 30 of the multiple printed units 24 that have been processed according to the present invention are then combined into a batch 26 in operation 88. In this operation, each of the first sections 30 are arranged to print sequentially in the first print column 16 of web 10. Similarly, each of the subsequent sections 30 are arranged to print in the corresponding subsequent print column 16, until the Nth sections 30 are arranged to print in the Nth print column 16. This batch arrangement is illustrated in FIG. 6.

In operation 90, print batch 26 is printed on printer 166, which is capable of printing N pages across print web 10.

The web 10 from the printer 166 is then directed to paper handling device 167 in operation 92. In operation 94, an interruption in the web print columns 16 such as a jog in the stacks of web print columns 16 or some other offset provides a visual or tactile indication of where the sections 30 of one print unit 24 ends and another print unit 24 begins. Web print columns 16 may then be separated into stacks of individual pages 14 with blank pad pages 19 or pad pages 18 in operation 96, each stack corresponding to one of the N print columns 16 of web 10.

These stacks then may be sorted into the N sections 30 corresponding to each print unit 24 in operation 98. Alternatively, the order of operations 96 and 98 may be reversed, with the sorting of the web print columns 16 into sections 30 relating to each print unit 24 then separating each print column 16 into N stacks e.g., (book sections). Any pad pages 18 inserted during the processing of the printed units in earlier operations 84 and 86 are removed at this point and the N sections 30 for each print unit 24 are stacked to assemble the pages for that printed unit 24. These page stacks are then combined into a book stack (e.g., layered one stack atop another) and directed to binder 168 for finishing in operation 102 to create the book to fulfill the customer order.

Figure 8:
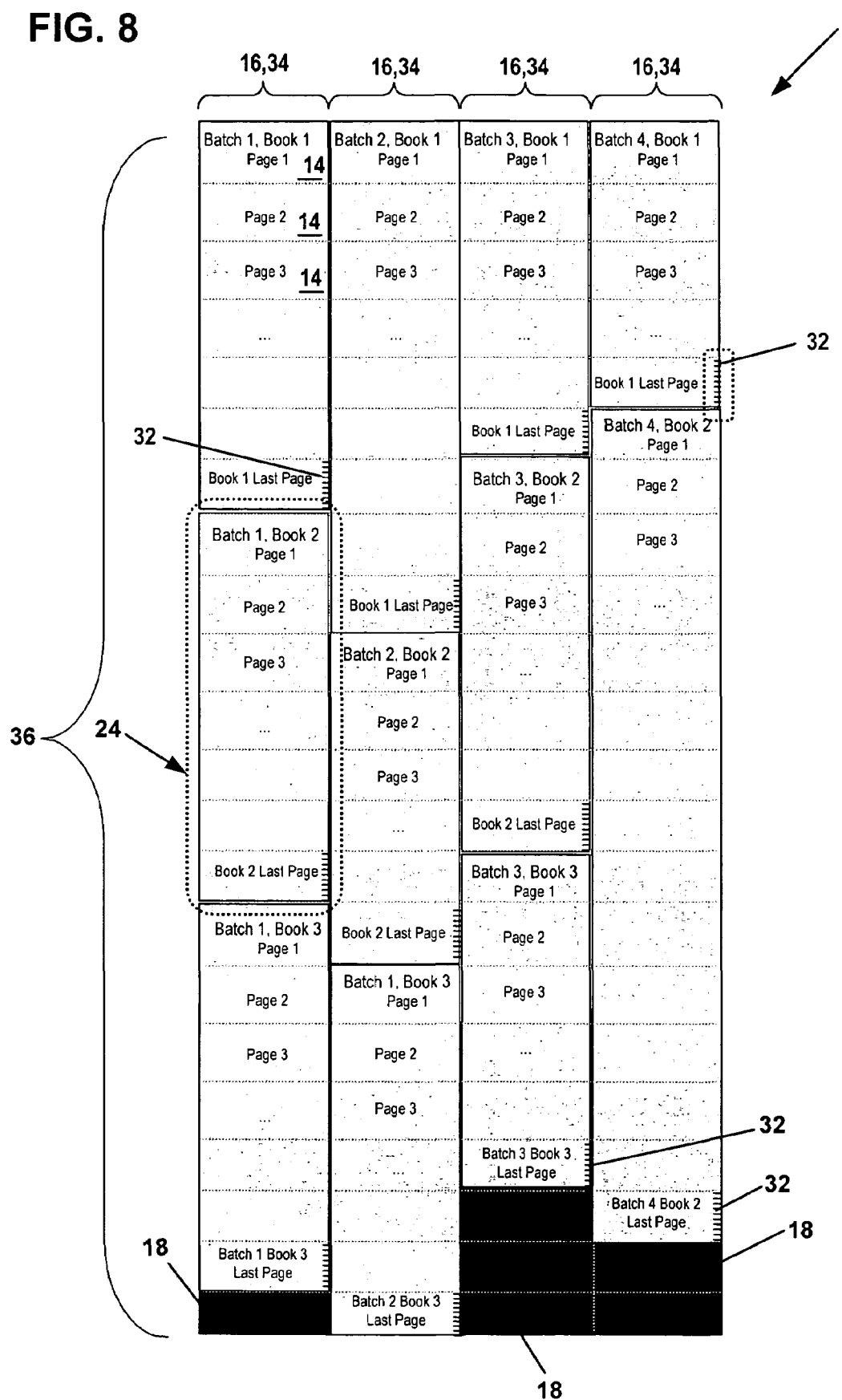
FIG. 8 is a diagram of a third embodiment of a print web layout for printing multiple publications in a 4-up arrangement according to the present invention.

Referring to FIG. 8, yet another possible embodiment processes multiple printed units 24 into a columnar print batch 34 and multiple print batches 34 into a larger super batch 36. In this embodiment, a 4-up implementation is depicted. However, the software algorithms drive any N-up implementation (2, 3, 4, etc).

With this embodiment, N print batches 34 are analyzed and interleaved so that printed units 24 in a single batch 34 are arranged linearly within a single print column 16. Each print column 16 corresponds to a different batch 34. The interleaving algorithms split print web 10 into N "virtual" webs or print batches 34, side-by side. A virtual web includes a portion of a print web 10 that results when web 10 is conceptually split into N print columns 16. For example, when 3-up is used, there are 3 virtual webs, or print columns 16, of output positioned on web 10. Within super batch 36, printed units 24 of the first batch 34 (i.e., the leftmost print column 16) are printed on the first virtual web, printed units 24 of the second batch 34 (i.e., the print column 16 second from the left) are printed on the second virtual web, etc. This process is conceptually equivalent to "gluing" N 1-up webs together and printing a columnar print 34 within each 1-up web. The result is a single print web 10 with N batches 34 formatted into N virtual webs 16 within super batch 36.

The batches 34 within a super batch 36 may have different lengths. Pad pages 18 may be inserted at the end of the batches 34 to ensure each batch 34 within a super batch 36 is of equal length. This process is similar to that described for book padding, above, with reference to FIGS. 3 and 5.

A multiple batch interleaving N=2 (2-up) example might include comparing the aggregate page count of the printed units 24 within the first and second Batches. For example, if the first batch 34 has printed units 24 with an aggregate page count of 25,650 pages and the second batch 34 has printed units 24 with an aggregate page count of 25,450 pages, then the second batch 34 would have 200 pad pages added.

A multiple batch interleaving N=3 (3-up) example might include comparing the aggregate page count of the printed units 24 within the first, second and third batches 34. If the first batch 34 has printed units 24 with an aggregate page count of 25,650 pages, the second batch 34 has printed units 24 with an aggregate page count of 25,450 pages, and the third batch 34 has printed units 24 with an aggregate page count of 25,350 pages, then the second batch 34 would have 200 pad pages added and the third batch 34 would have 300 pad pages added.

Printed super batches 36 could be output by printer 166 either continuously (as fanned output) or via specialized N-up slit-stack finishing equipment, such as page handling device 167. An offset command (as described above) is inserted at the end of each printed unit 24. This offset command will result in a true book break in the print column 16 where the print unit 24 ending is positioned and one or more "phantom" book splits across the other print columns 16. A phantom split refers to a jog positioned in one of the print columns 16 to denote the end of a print unit 24 but which does not correspond to the end of a print unit 24 in the other print columns 16. For example, in the 3-up multiple batch interleaving example above, if an end of a print unit 24 in the first Batch is located at a particular page, an offset command will be inserted to create a jog or a true book break in the output at this page in the first print column 16. This jog would also be created in the second and third print columns 16 at the same page, even though the neither of the printed units 24 in the second and third print columns 16 end at this page. Thus, in the second and third print columns 16, a phantom book split is placed. To ensure reassembly in binding processing after printing, a special book end mark 32 may be applied to the last page of each print unit 24 along its edge. Mark 32 may be a barcode or mark-sense mark, similar to that described above in FIG. 6 regarding the marking of pad page 18. Mark 32 will be used to detect a true book end vs. a phantom split. Both manual and automated (e.g., conveyor assisted) post processing can then be used to stack sections into complete printed units 24. Alternatively, more specialized slit-stack or other post-printing equipment could individually handle each set of stacks, independently jogging a single stack at the end of print unit 24 and thus eliminating the need for "phantom" book splits.

As printed units 24 are passed from printer 166 to paper handling device 167 and binder 168, pad pages 18 or 19 at the end of super batch 36 are then removed, either manually or automatically with equipment such as mark-sensing page removal equipment. This process has been previously described above.

Figure 9:
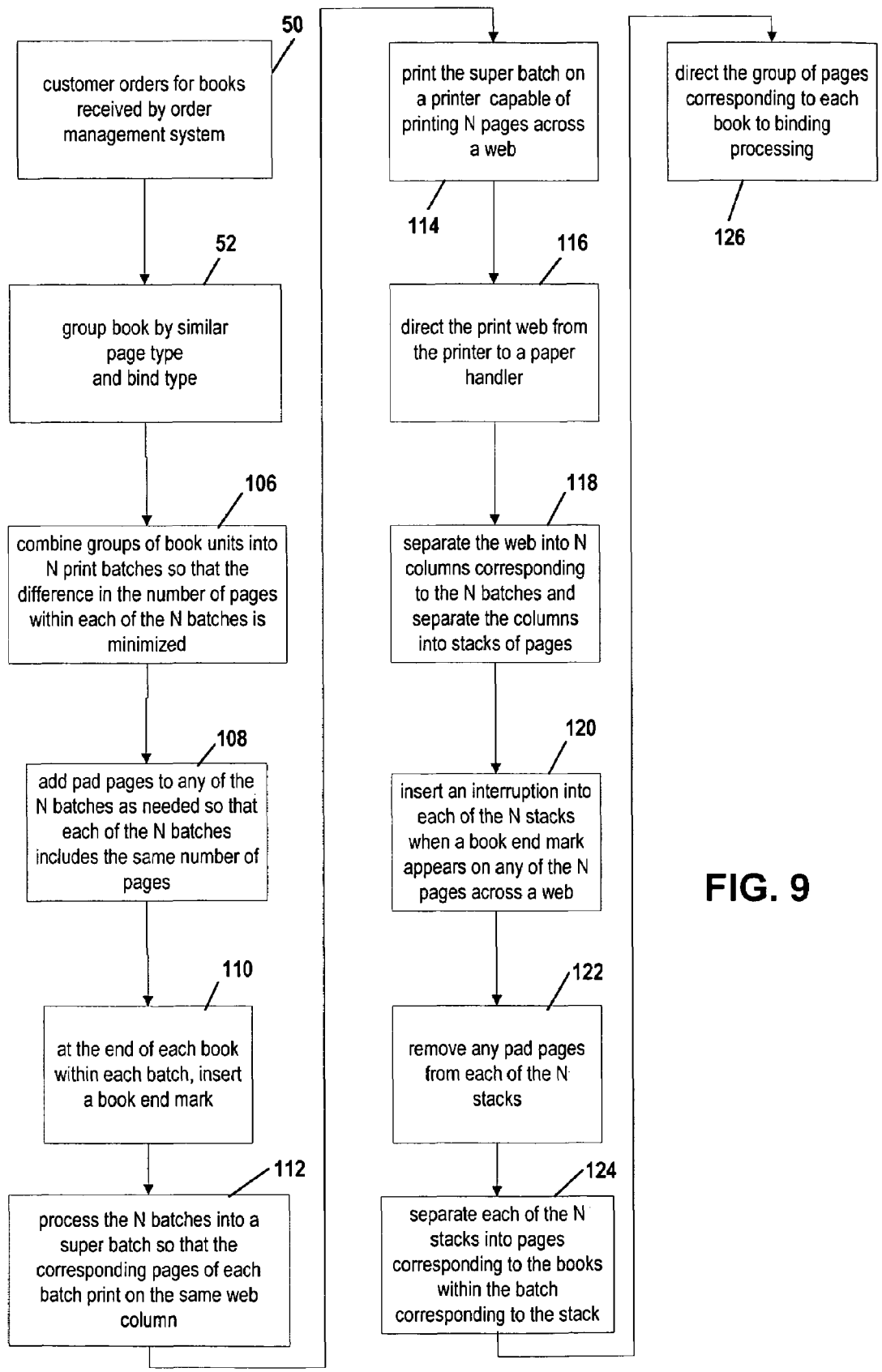
FIG. 9 is a flow chart of a third embodiment of the operations for preparing multiple publications for N-up printing in the print web layout shown in FIG. 8.

Referring now to FIG. 9, a flow chart shows a process of preparing printed units 24 in a super batch 36 for printing in the format shown in FIG. 8. As with the other flow charts, this process begins with customer orders being received in an order management system in operation 50. The printed units 24 that have been ordered are grouped by similar page type (e.g., size, thickness, color) and binding type in operation 104. Groups of printed units 24 with similar page type and binding type are combined into one of N print batches 34 in operation 106. The number of printed units 24 in each print batch 34 should be selected so that the difference in the total number of pages in each print batch 34 is minimized. In one possible embodiment, orders received from different customers 158 are sorted together to further enhance efficiency.

Once N print batches 34 have been created, pad pages 18 or 19 are added as needed to print batches 34 so that each of the N print batches 34 in a super batch 36 has the same total number of pages. At the end of each print unit 24 within each batch 34, a book end mark 32 is inserted in operation 110. Print batches 34 are then processed into a super batch 36 so that corresponding pages of each batch print on the same web print column 16 in operation 112. This super batch 36 is sent to a printer 166 capable of printing N pages across each web and printed in operation 114.

Upon printing, the print web 10 may be directed from the printer 166 to a paper handler 167 in operation 116. The web of a super batch 36 is then be separated into N print columns 16 and the print columns separated into stacks of pages. Each stack corresponds to one of the print batches 34 used to create the super batch 36 in operation 118. In operation 120, an interruption, stack feed sequence, or a jog is inserted into each stack by an offset command when a book end mark 32 appears in any stack. In operation 122, any pad pages 18 are removed from the N stacks. Each N stack is then separated into individual print units 24 in operation 124. To separate each stack into separate print units 24, jogs in each stack are reviewed to determine if a book end mark is included in the stack at that page (meaning that the jog marks a real book break in this stack) or if there is no book end mark in the stack at that jog (meaning that the real book break is in another stack and that this is a phantom book break in this stack). It is anticipated that operations 116 to 124 may be arranged in different orders without departing from the present invention.

Finally, after each stack has been separated into print units 24, these print units 24 are directed to binder 168 for preparation and assembly into a book to fulfill the customer order received in operation 50.

In an alternate embodiment, several super batches (as described above) would be combined sequentially into a "virtual super batch". This "virtual super batch" is then streamed to a printer and provide several hours of continuous printing for that printer. This method would effectively transform a book-oriented print unit job stream, as described above, into N statement-oriented (e.g., credit card monthly statement, phone bill, etc) job streams.

The embodiments of the inventions disclosed herein have been discussed for the purpose of familiarizing the reader with novel aspects of the present invention. Although preferred embodiments have been shown and described, many changes, modifications, and substitutions may be made by one having skill in the art without unnecessarily departing from the spirit and scope of the present invention. Having described preferred aspects and embodiments of the present invention, modifications and equivalents of the disclosed concepts may readily occur to one skilled in the art. However, it is intended that such modifications and equivalents be included within the scope of the claims which are appended hereto.

The invention claimed is:

1. A method of preparing a plurality of printed units for printing on a printer adapted for printing N pages across a web, each printed unit having a page type, a binding type and a page count, comprising:

grouping the plurality of printed units based on page type and binding type, the plurality of printed units including at least two different print units;

sorting the plurality of printed units within a group of similar page type and binding type by page count;

combining N printed units with similar page counts, and adding pad pages to any of the N printed units as necessary to form N print columns each having the same number of pages; and, processing the N print columns into a batch for printing.

2. The method of claim 1, wherein the method further comprises printing the batch on the printer so that across each web a page from each N print column is printed.

3. The method of claim 2, wherein the printer includes a finishing device and the method further comprises the finishing device slitting and cutting each web after printing into N stacks, each stack including the pages from one of the N print columns.

4. The method of claim 3, wherein any pad pages within the N stacks are removed so that each N print column includes the pages corresponding to one of the N printed units within the batch.

5. The method of claim 4, wherein the pad pages are marked to distinguish them from the pages of the printed unit and the pad pages are removed by an automated mark sensing device.

6. The method of claim 2, wherein the printer includes a finishing device for differentiating between the pages of successive batches upon receipt of an offset command and wherein the method further comprises printing multiple batches in succession and sending an offset command to the finishing device between each batch.

7. The method of claim 6, wherein the finishing device slits and cuts each web after printing into N stacks, each stack including the pages from one of the N print columns.

8. The method of claim 2, wherein the webs are output from the printer as a continuous fanfold sheets.

9. The method of claim 2, wherein the webs are output from the printer as individual sheets.

10. A method of preparing a plurality of printed units for printing on a printer adapted for printing N pages across a web, each printed unit having a page type, a binding type and a page count, comprising:
grouping the printed units based on page type and binding type;
combining the printed units into N batches with each batch including one or more printed units to minimize the difference in the total number of pages of the printed units in each of the N batches;
adding pad pages to equalize the number of pages within each of the N batches; and,
processing each of the N batches into a super batch to print on the printer so that a first batch prints in a first page on the web, each successive batch prints in a successive page on the web, and the N batch prints on an Nth page of the web.

11. The method of claim 10, further comprising printing the super batch on the printer so that across each web a page from each N batch is printed.

12. The method of claim 11, wherein the printer includes a finishing device for differentiating between successive printed webs upon receipt of an offset command and wherein the method further comprises sending an offset command to the finishing device at the end of each printed unit within any of the batches.

13. The method of claim 12, wherein the finishing device slits and cuts each web after printing into N stacks, each stack including the pages from one of the N batches.

14. The method of claim 11, further comprising adding a book end mark to the last page of each printed unit within each batch.

15. The method of claim 11, wherein the printer includes a finishing device and the method further includes the finishing device slitting and cutting each web after printing into N stacks, each stack including the pages from one of the N batches.

16. The method of claim 15, wherein each stack is sorted into printed units.

17. The method of claim 16, wherein a book end mark is printed on the last page of each printed unit within each batch, and an automated mark sensing device is used to sort the printed units within each stack.

18. The method of claim 15, wherein any pad pages within the batches are removed.

19. The method of claim 18, wherein the pad pages are marked to distinguish them from the pages of the printed units and the method further comprises removing the pad pages using an automated mark sensing device.

20. A method of preparing printed units for printing on a printer adapted for printing N pages across a web comprising:
providing a plurality of printed units, the plurality of printed units including two or more different print units, each printed unit including a plurality of pages;
dividing a first printed unit into N sections and adding pages to any of the N sections for first printed unit to equalize the number of pages within each section;
dividing each successive printed unit into N sections;
adding pages to any section of each printed unit to make the number of pages in each of the sections within a printed unit are equal; and,
processing each of the N sections of each printed unit into a printing batch with N print columns, with the first section of the first printed unit at a top of the first print column, followed by the first section of each of the successive printed units in the first print column, each successive section of the first printed unit at a top of each of the successive print columns followed by the successive sections of the successive printed units in those print columns.

21. The method of claim 20, further comprising sending the printing batch to the printer and the printer printing the batch such that each of the N print columns of the printing batch prints in one of the N pages of the web and the printer outputs the webs into a stack.

22. The method of claim 21, wherein the printer includes a finishing device including a means for inserting a jog in the stack of webs to differentiate between successive printed webs upon receipt of an offset command and wherein the method further comprises sending an offset command to the finishing device at the end of each printed unit section.

23. The method of claim 21, wherein the printer includes a finishing device including a means for slitting and cutting the webs output from the printer into N stacks.

24. The method of claim 23, wherein the finishing device further includes a means for inserting a jog in the N stacks of webs to differentiate between successive printed webs upon receipt of an offset command and wherein the method further comprises sending an offset command to the finishing device at the end of each printed unit section.

25. The method of claim 23, wherein the pages added to each section of a printed unit are pad pages and the method further includes sorting each of the N stacks into smaller stacks, each smaller stack corresponding to one of the sections of one of the printed units, removing the pad pages from the smaller stacks and combining N smaller stacks corresponding to the same printed unit.

26. The method of claim 23, wherein the pages added to each section of a printed unit are blank pages and the method further includes sorting the N stacks into smaller stacks, each smaller stack corresponding to one of the sections of one of the printed units, and combining the smaller stacks corresponding to the same printed unit without removing the blank pages.

27. A print processing system for preparing printed units for printing on a printer adapted for printing N pages across a web, the print processing system comprising:

a digital storage containing digital copies of a plurality of printed units, the plurality of printed units including two or more different printed units; and, a processor in data communication with the digital storage, the processor including a print queue, the processor configured to retrieve digital copies of printed units from the database and prepare the printed units for printing, including sorting the digital copies of printed units into groups for printing based on page type and bind type, sorting the digital copies of printed units within each group based on page count, processing each group into digital print batch for printing by combining N printed units of the group having similar page counts, adding pages to any of the N printed units as needed to form N print columns each having the same number of pages and creating a digital print batch from the N print columns and sending the digital print batch to the print queue.

28. The system of claim 27, wherein the system further comprises a printer in data communication with the processor, the printer capable of printing N pages across a print web, the print queue sends the digital print batches to the printer for printing, and the printer generates hardcopy prints of the pages of the digital print batch.

29. The system of claim 28, wherein the system further comprises a page handling device for separating each hardcopy prints into individual pages and combining the individual pages into hardcopies of the digital copies of the printed units ordered.

30. A print processing system for preparing printed units for printing on a printer adapted for printing N pages across a web, the print processing system comprising:

a database containing digital copies of a plurality of printed units, the plurality of printed units including two or more different printed units; and, a processor in data communication with the database, the processor including a print queue, the processor configured to retrieve digital copies of printed units from the database and prepare the digital copies of printed units for printing, including sorting the digital copies of printed units into groups for printing based on page type and bind type, sorting the digital copies of printed units within each group based on page count, processing each group into a digital print batch for printing including combining the digital copies of printed units into N batches with each batch including one or more printed units to minimize the difference in the total number of pages of the printed units in each of the N batches, adding pages to equalize the number of pages within each of the N batches, processing each of the N batches into a super batch to print on the printer so that a first batch prints in a first page on the web, each successive batch prints in a successive page on the web, and the N batch prints on an Nth page of the web and creating a digital print batch from each super batch, and sending the digital print batch to the print queue.

31. The system of claim 30, wherein the system further comprises a printer in data communication with the processor, the printer capable of printing N pages across a print web, the print queue sends the digital print batches to the printer for printing, and the printer generates hardcopy prints of the pages of the digital print batch.

32. The system of claim 31, wherein the system further comprises a page handling device for separating each of the hardcopy prints into individual pages and combining the individual pages into hardcopies of the digital copies of the printed units ordered.

33. A print processing system for preparing printed units for printing on a printer adapted for printing N pages across a web, the print processing system comprising:

a database containing digital copies of a plurality of printed units the plurality of printed units including two or more different printed units; and, a processor in data communication with the database, the processor including a print queue, the processor configured to retrieve digital copies of printed units from the database and prepare the digital copies of printed units for printing, including separating each printed units into N sections for printing, adding pages to any section of a printed unit as needed so that each section of a printed unit has the same number of pages, processing each of the N sections of each printed unit into a printing batch with N print columns, with the first section of the first printed unit at a top of the first print column, followed by the first section of each of the successive printed units in the first print column, each successive section of the first printed unit at a top of each of the successive print columns followed by the successive sections of the successive printed units in those print columns, with the Nth section of the first printed unit at the top of the Nth print column followed by the Nth section of each of the successive printed units in the Nth print column, and creating a digital print batch from each printing batch, and sending the digital print batch to the print queue.

34. The system of claim 33, wherein the system further comprises a printer in data communication with the processor, the printer capable of printing N pages across a print web, the print queue sends the digital print batches to the printer for printing, and the printer generates hardcopy prints of the pages of the digital print batch.

35. The system of claim 34, wherein the system further comprises a page handling device for separating each of the hardcopy prints into individual pages and combining the individual pages into hardcopies of the digital copies of the printed units ordered.

* * * * *